No. 748,076. Patented December 29, 1903.

UNITED STATES PATENT OFFICE.

ADOLF ISRAEL AND RICHARD KOTHE, OF ELBERFELD, GERMANY, ASSIGNORS TO FARBENFABRIKEN OF ELBERFELD CO., OF NEW YORK, N. Y., A CORPORATION OF NEW YORK.

TRISAZO DYE.

SPECIFICATION forming part of Letters Patent No. 748,076, dated December 29, 1903.

Application filed April 2, 1903. Serial No. 150,754. (Specimens.)

*To all whom it may concern:*

Be it known that we, ADOLF ISRAEL and RICHARD KOTHE, (assignors to the FARBENFABRIKEN OF ELBERFELD COMPANY, of New York,) residing at Elberfeld, Germany, have invented a new and useful Improvement in Trisazo Dyes; and we hereby declare the following to be a clear and exact description of our invention.

Our invention relates to the production of new and valuable trisazo dyestuffs derived from 1-acetylamido-2-4-diamidobenzene, which body is described in application for Letters Patent, Serial No. 150,763, filed April 2, 1903. These new trisazo dyestuffs have the following general formula:

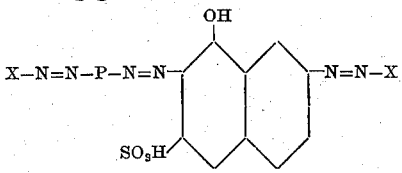

P meaning the radical of a paradiamin—such as of para-phenylenediamin, para-diamidodiphenylamin, benzidin, tolidin, dianisidin, or the like—X meaning the radical of 1-acetylamido-2-4-diamidobenzene, which can be once replaced by a base capable of combining with diazo compounds. Of these bases we cite the following as typical: meta-phenylenediamin, chloro-meta-phenylenediamin, meta-toluylenediamin, 2:4-diamidoanisol, alpha-naphthylamin, or the like.

The new process for preparing these dyestuffs consists in combining the tetrazolized azo dyestuffs derived from a para-diamin and one molecule of gamma-amidonaphthol sulfonic acid either with two molecules of 1-acetylamido-2-4-diamidobenzene, or at first with one molecule of this body and then with one molecule of one of the above-cited bases, or at first with one molecule of one of these bases and then with one molecule of 1-acetylamido-2-4-diamidobenzene.

The dyestuffs produced in the above-defined manner are dark powders, which dissolve in water with a bluish-black color. They dye unmordanted cotton from brownish-black to bluish-black to black shades.

In carrying out our new process practically we can proceed as follows, the parts being by weight: Fifteen parts of acetylparaphenylenediamin are diazotized in the usual manner, and the resulting diazo compound is stirred into a solution of twenty-four parts of 2:8:6-amidonaphthol sulfonic acid gamma containing an excess of sodium carbonate. From the resulting azo dyestuff the acetyl group is split off in the usual way by boiling it with caustic-soda lye. The monoazo dyestuff thus produced having the formula

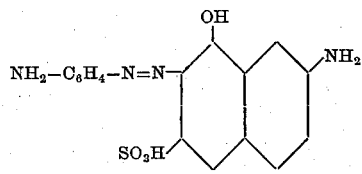

is then tetrazotized by means of fourteen parts of sodium nitrite and sixty parts of hydrochloric acid, (twenty per cent.) The tetrazo compound thus prepared is then mixed with an aqueous solution of fifty parts of crystallized sodium acetate and an aqueous solution of 16.5 parts of 1-acetylamido-2:4-diamidobenzene. When the formation of the intermediate compound is completed, a solution of 12.2 parts of meta-toluylenediamin containing an excess of sodium carbonate is added. After being stirred for a short time the new dyestuff is precipitated by the addition of common salt, filtered off, and dried.

The new trisazo coloring-matter has in a free state the following formula:

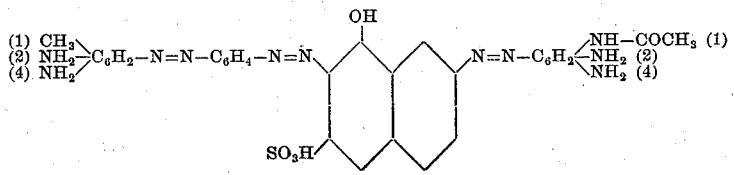

which, in the shape of the sodium salt, is a dark powder, soluble in water with a bluish-black color, assuming a greener tint by the addition of ammonia. It is soluble in concentrated sulfuric acid of 66° Baumé with a blue color, a reddish-black precipitate being obtained by the addition of ice. It dyes unmordanted cotton deep-black shades.

Having now described our invention and in what manner the same is to be performed, what we claim as new, and desire to secure by Letters Patent, is—

1. The herein-described new trisazo dye-stuffs which are alkaline salts of acids having the above-defined general formula, and which are dark powders, soluble in water with a bluish-black color; dyeing unmordanted cotton from brownish-black to bluish-black to black shades, substantially as described.

2. The herein-described new trisazo dye-stuff, being an alkaline salt of an acid having the above-defined formula which, in the shape of the sodium salt, is a dark powder, soluble in water with a bluish-black color assuming a greener tint by the addition of ammonia; being soluble in concentrated sulfuric acid of 66° Baumé with a blue color, a reddish-black precipitate being obtained therefrom by the addition of ice; dyeing unmordanted cotton deep-black shades, substantially as hereinbefore described.

In testimony whereof we have signed our names in the presence of two subscribing witnesses.

ADOLF ISRAEL.
    RICHARD KOTHE.

Witnesses:
 OTTO KÖNIG,
 ALBERT HEMSING.